(12) United States Patent
El-Damhougy

(10) Patent No.: US 7,693,120 B2
(45) Date of Patent: Apr. 6, 2010

(54) NEURAL NETWORK-BASED MOBILITY MANAGEMENT FOR SELF-PARTITION DETECTION AND IDENTIFICATION OF MOBILE AD HOC RADIO NETWORKS

(75) Inventor: Hesham El-Damhougy, Tustin, CA (US)

(73) Assignee: The Boeing Company, Chicago, IL (US)

( * ) Notice: Subject to any disclaimer, the term of this patent is extended or adjusted under 35 U.S.C. 154(b) by 819 days.

(21) Appl. No.: 11/426,425

(22) Filed: Jun. 26, 2006

(65) Prior Publication Data

US 2007/0297374 A1 Dec. 27, 2007

(51) Int. Cl.
*H04W 4/00* (2009.01)
(52) U.S. Cl. .................. 370/338; 370/328; 455/518; 455/519; 455/424
(58) Field of Classification Search .................. 70/338, 70/328; 455/518, 519, 424; 370/332, 328
See application file for complete search history.

(56) References Cited

U.S. PATENT DOCUMENTS 7,414,996 B2 * 8/2008 Fan .............................. 370/338

\* cited by examiner

*Primary Examiner*—Nghi H Ly
(74) *Attorney, Agent, or Firm*—Law Office of Charles W. Peterson, Jr.

(57) ABSTRACT

A method of managing an ad hoc communications network of wireless devices or nodes. The network is connected if all nodes can communicate with each other and otherwise partitioned. Partitions are identified by recursively applying a connectivity function to a connectivity matrix representative of the network. The number of times the connectivity function is recursively applied is determined by the network diameter. If the result of the recursive application is a unity matrix, the network is connected; otherwise it is disconnected. Also, if the network diameter exceeds a selected maximum length, the network may be voluntarily partitioned into connected sub-networks by recursively applying the connectivity function a lesser number of times to the connectivity matrix. The lesser number of times is determined by the selected maximum length or maximum allowable number of hops.

25 Claims, 10 Drawing Sheets

| | |
|---|---|
| | MAXIMUM NUMBER OF HOPS H = $2^\eta$ < GRAPH DIAMETER |
| | WHILE NUMBER OF NODES V ≠ Φ (EMPTY SET) DO |
| 220 | FORM $\Omega^{\eta+1}$ |
| 222/224 | IF $\Omega^{\eta+1}$ = [1] THEN STOP, RESULTING GRAPH IS A CLIQUE, GRAPH IS FULLY CONNECTED |
| 226/228 | APPLY PATTERN MATCHING TO THE MATRIX $\Omega^\eta$ ROWS STARTING WITH A NODE OF MINIMUM DEGREE δ |
| 230 | ORDER WITH RESPECT TO NODE DEGREES |
| 232 | STOP WHEN MATCHED NUMBER OF ROWS = δ |
| | REMOVE RESULTING CLIQUE FROM THE GRAPH |
| 234 | GO TO STEP 3, FOR THE REMAINING GRAPH |
| 236 | STOP WHEN V = Φ |
| | END WHILE |

FIG. 5B

NEURAL NETWORK-BASED MOBILITY MANAGEMENT FOR SELF-PARTITION DETECTION AND IDENTIFICATION OF MOBILE AD HOC RADIO NETWORKS

CROSS REFERENCE TO RELATED APPLICATION

The present invention is related to U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005; and to U.S. patent application Ser. No. 11/426,417, "NEURAL NETWORK-BASED MOBILITY MANAGEMENT FOR MOBILE AD HOC RADIO NETWORKS," U.S. Pat. No. 7,555,468, "NEURAL NETWORK-BASED NODE MOBILITY AND NETWORK CONNECTIVTY PREDECTIONS FOR MOBILE AD HOC RADIO NETWORK," and U.S. patent application Ser. No. 11/426,428, "NEURAL NETWORK-BASED MOBILITY MANAGEMENT FOR HEALING MOBILE AD HOC RADIO NETWORKS," to Hesham El-Damhougy, filed coincident herewith, all four assigned to the assignee of the present invention and incorporated herein by reference.

BACKGROUND OF THE INVENTION

1. Field of the Invention

The present invention generally relates to an adaptable mobile communications networks and, more particularly, to managing an ad-hoc mobile network for adaptable wireless communications in an unstructured environment such as a tactical battlefield.

2. Background Description

Tactical radio communications rely heavily on mobile radio networks and systems that are continually changing while in use. Emerging tactical battlefield networks typically include a collection of mobile autonomous host nodes or terminals that support numerous mobile clients. Unlike a typical commercial mobile telephone network, for example, these mobile nodes are not connected together by fixed land based connections (e.g., hard wired), but continually move into and out of radio communication range with each other. Consequently, one generally cannot rely on a pre-defined fixed infrastructure within this type of environment. Moreover, the nodes may be destroyed, or new nodes may join the network. Thus, such a mobile, wireless network may be considered dynamically changing and so, infrastructure-less or "ad-hoc" in that the nodes and node locations dynamically change over time. As a result, the connectivity among the nodes may vary with time.

Since a typical wireless ad-hoc network lacks fixed communications nodes (e.g., base stations) to define the network, a group of autonomous nodes or terminals serve to define the network. The autonomous nodes form a decentralized multi-hop radio network and communicate with each other to maintain connectivity. Each node may represent radio communication devices that may be located with a person (such as a war-fighter), located on/in a ground or an air vehicles platform, e.g., an Unmanned Air Vehicle (UAV), and an Unmanned Ground Vehicles (UGV). As is typical with any network, such a wireless ad-hoc network can be represented graphically by a set of time varying vertices representing network nodes with edges between nodes that are capable of communicating with each other. So, at any particular time, for example, the network nodes may be represented as a set of points. A graph edge or line between two vertices indicates that the two nodes are connected, i.e., the corresponding nodes can reach each other (or communicate) by a radio link. So, each line represents a radio link between two communicating nodes. Two radio nodes are said to be communicating if the link quality is above a predefined threshold, e.g., where the signal-to-noise ratio (SNR) is above a predefined threshold. Nodes are communicating indirectly or through an indirect path in a path that passes through at least one intermediate node.

Normally, each mobile node in a wireless ad-hoc network can communicate at least with one or more neighboring mobile nodes that are a single radio hop away. Since, typically, the wireless ad-hoc network is operating in the absence of fixed radio relay base stations; each mobile node operates not only as a host but also as a router to relay communications from other connected nodes. Thus, the nodes are typically forwarding/relaying information packets between other mobile nodes in the wireless ad-hoc network that may not be within direct wireless transmission range of each other. So, network control is distributed among the nodes and each node participates in an ad-hoc routing protocol that allows it to discover "multi-hop" paths through the network to any other node.

Further, since the nodes are mobile, and because of node departures and additions, the network topology may change rapidly and unpredictably over time. Nodes can fail, for example, if they are destroyed or due to hard or soft failures which occur in the battlefield. Typical radio communication effects, such as noise, fading, and interference, can impede communications and prevent some nodes from connecting to others. Consequently, for reliable communications the wireless ad-hoc network must be able to compensate for variable link quality. Wireless propagation path loss, fading, multi-user interference, distance between nodes and signal strength variations can all affect connection quality. In addition, operating area/network topology losses can further interfere with communications. Changes in propagation conditions and the environment, such as inclement weather, and irregular terrain (e.g., interrupted by mountains and buildings), for example, can interfere with network communications. Thus, changes in propagation conditions and the environment, as well as the unpredictability of node movements and sporadic node failures, can contribute to the dynamic nature of an ad-hoc network. Further, when links between nodes break, the network can be split into isolated sub-networks. Such a break in the network can create a situation where some nodes cannot communicate with others, i.e., there are absolutely no direct or indirect paths between these nodes. In this case, the network is said to be "partitioned." These problems are even further complicated in a military environment where the preservation of security, latency, reliability, intentional jamming, and recovery from failure are significant concerns.

The Department of Defense (DoD) has instituted an initiative known as the Joint Tactical Radio System (JTRS) to provide a flexible new approach to meeting diverse war-fighter communications needs through software-programmable tactical radio technology or "software defined radios (SDRs)." In particular, these SDRs are intended for voice, data and video communications across a battle-space. However, beyond the battlefield, the JTRS may have application for initiatives in areas as diverse as homeland security, Federal, state and local law enforcement, search and rescue, commercial aviation and international commercial applications. The JTRS implements the concept of relay and translation nodes (land, sea, air and space based) to help ensure that tactical users can access required information wherever it resides. To accomplish this, however, nodes must be able to communicate with each other in spite of links being broken frequently as nodes move, randomly fail, or are destroyed e.g., in enemy or unintentional attacks.

Accordingly, there is a need for an ad-hoc mobile network that can adapt well to link changes and to loss of connectivity between nodes and groups of nodes, and to interconnectivity changes between ad-hoc mobile network nodes. Further, there is a need to maintain network-wide connectivity in ad-hoc networks, i.e., maintaining communication paths, either node-to-node or by multiple-node-hopping and routing, that allows any two nodes to maintain communication with one another.

SUMMARY OF THE INVENTION

An embodiment of the present invention includes managing an ad hoc communications network of wireless devices or nodes. The network is connected if all nodes can communicate with each other and otherwise partitioned. Partitions are identified by recursively applying a connectivity function to a connectivity matrix representative of the network. The number of times the connectivity function is recursively applied is determined by the network diameter. After an initial partitioning, connectivity is checked upon changes to connectivity status of the local or global network. Typically such changes include expiration of a predicted link life between network nodes and node deletions/additions. If the result of the recursive application is a unity matrix (i.e., all entries are 1), the network is connected; otherwise it is disconnected. Also, if the network diameter exceeds a selected maximum length or maximum allowable number of hops, the network may be voluntarily partitioned into connected sub-networks of an acceptable size. The partitions need not be unique and may be identified by recursively applying the connectivity function a lesser number of times to the connectivity matrix with subsequent pattern matching. The lesser number of times is determined by the selected maximum length. In addition the connectivity may also be checked periodically with a predefined periodicity parameter, i.e., every $\tau$ units of time, where $\tau$ is a selected system parameter that can be either deterministic or a random variable. This system parameter can be identified during the system simulation and then adaptively refined or fine tuned during real time operation.

Advantageously, a preferred ad hoc communications network is self-managing and adapts well to operating changes, and in particular to interconnectivity changes between preferred nodes. The network is self-partitioning both for necessity, e.g., the loss of a link or linking node that divides the network into unconnected pieces, or voluntarily, e.g., to conform with network constraints.

BRIEF DESCRIPTION OF THE DRAWINGS

The foregoing and other objects, aspects and advantages will be better understood from the following detailed description of a preferred embodiment of the invention with reference to the drawings, in which:

FIGS. 5A-B shows an example of voluntarily partitioning.

DETAILED DESCRIPTION OF THE INVENTION

Figure 1A:
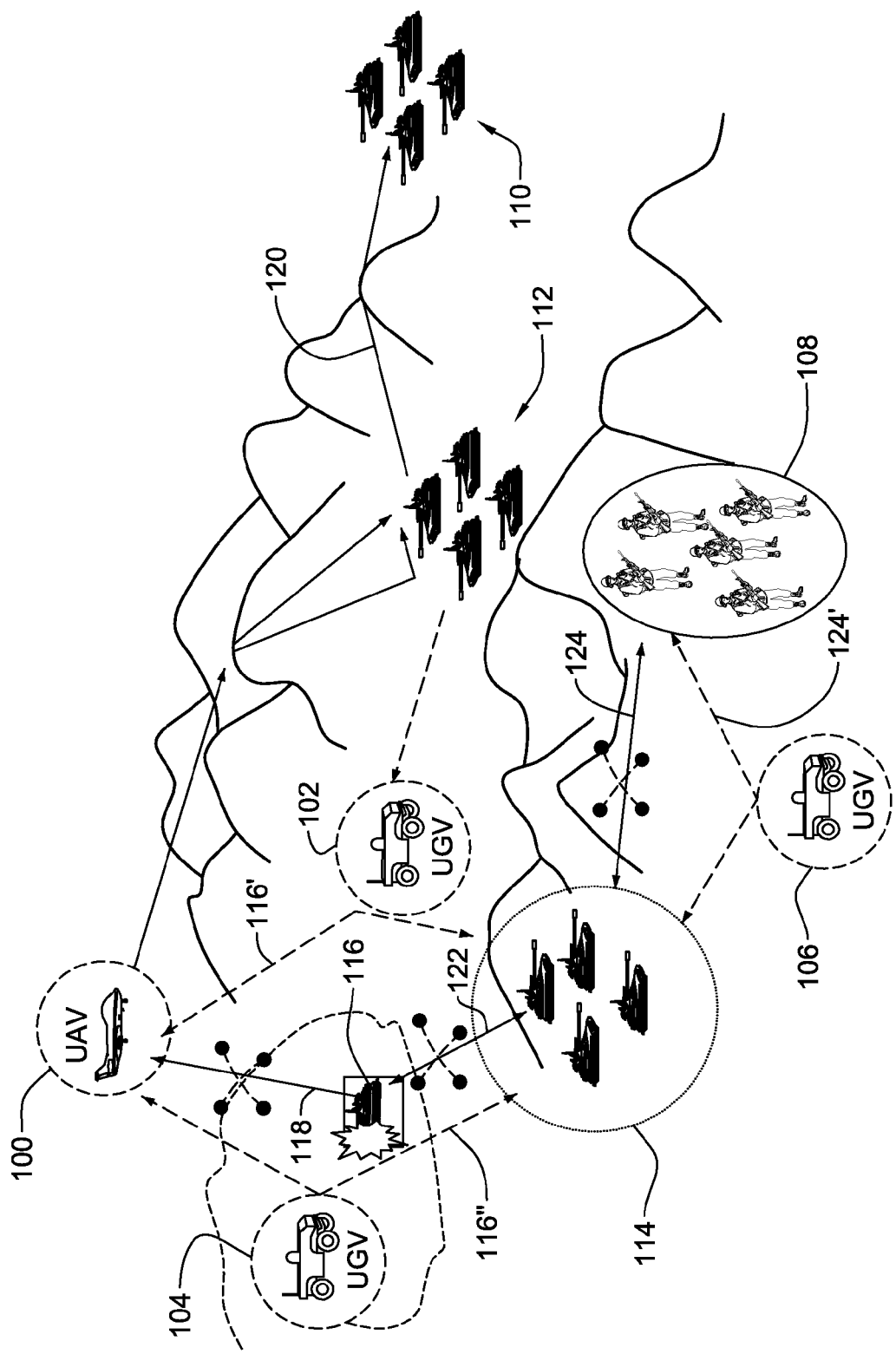
FIGS. 1A-C show a battlefield example of an ad hoc hierarchical mobile communications network and graphical representations of the battlefield example according to an advantageous embodiment of the present invention.
Figure 1B:
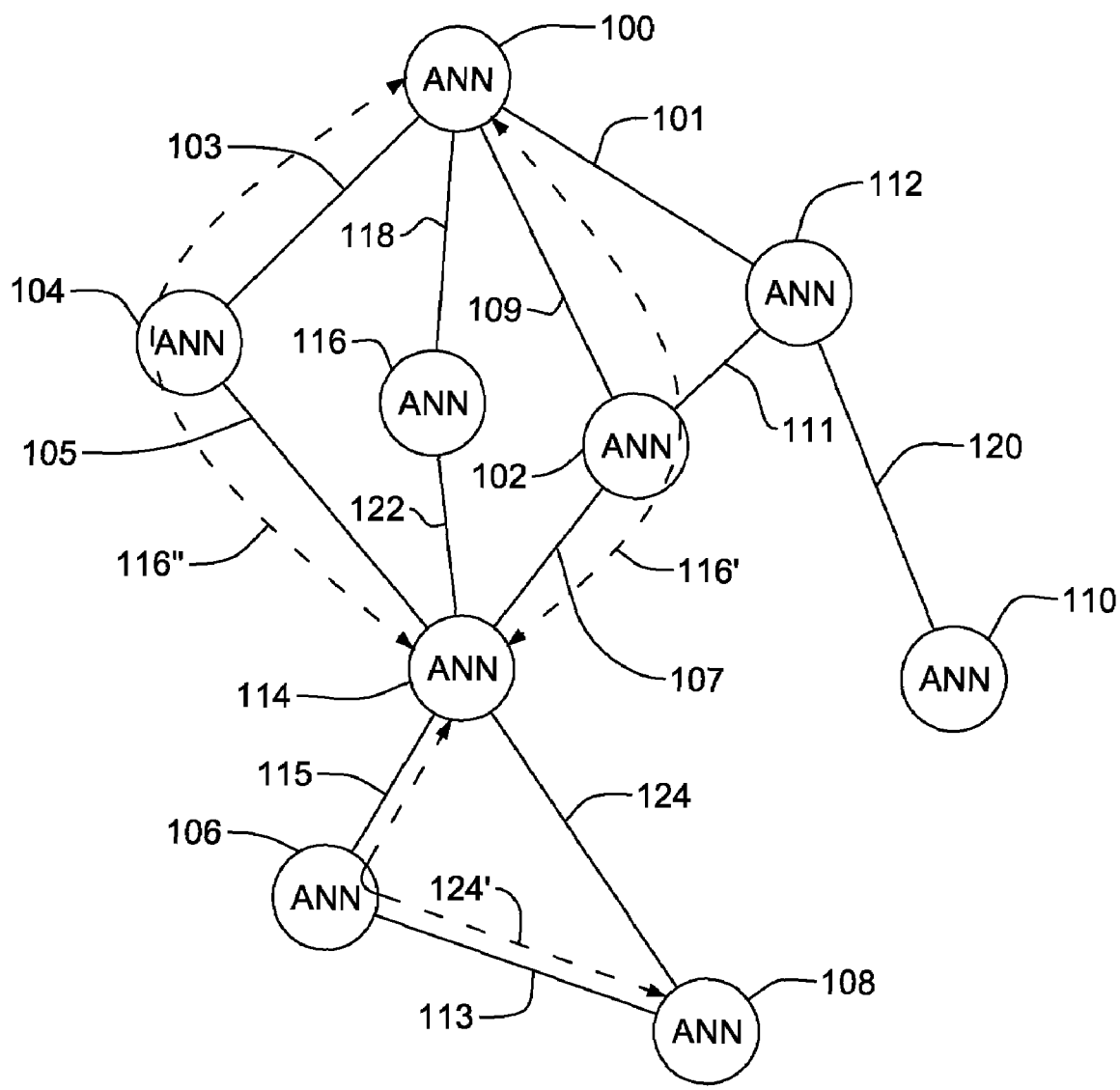
Figure 1C:
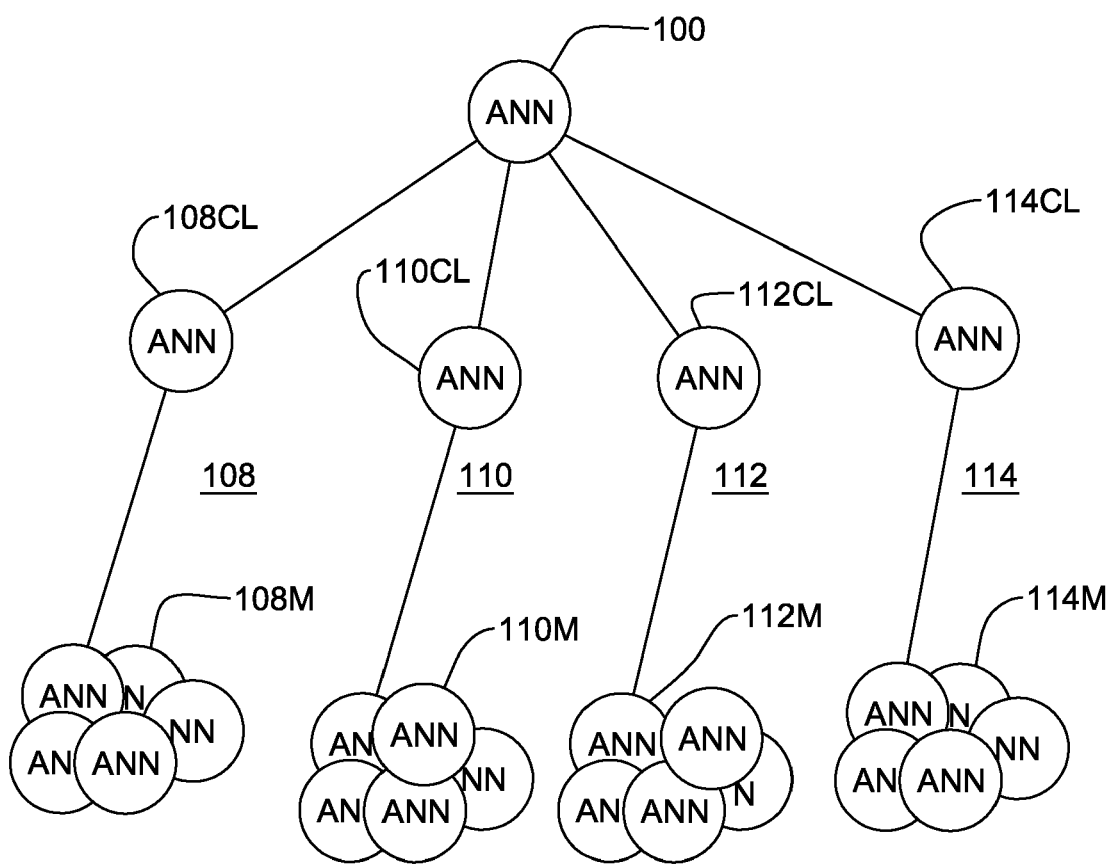

Turning now to the drawings and more particularly, FIGS. 1A-C show a battlefield example of a self monitoring ad hoc mobile communications network and graphical representation of the battlefield example according to an advantageous embodiment of the present invention. The preferred self monitoring ad hoc mobile radio network is an Artificial Neural Network (ANN) based communications network. More particularly, a preferred ad hoc mobile radio network is an Adaptive Self Organizing Neural Network (ASONN) of self monitoring artificial neurons or, an ANN element based communications devices, stations or nodes and is referred to herein as a Mobile Communications Neural Network (MCNN). Each node monitors other directly connected nodes to identify and predict disconnections and, expected re-connections. As shown in this example, a MCNN may include both airborne and ground based communications units or stations as nodes and, preferably is hierarchically organized. Although described herein with reference to a battlefield application, this is for example only and not intended as a limitation. The present invention has application to quickly providing self-sustaining and self-organized communications where no fixed land mobile network may be available or has been destroyed, e.g., in an emergency situation or during a severe natural disaster.

The MCNN airborne nodes may include both unmanned air vehicles (UAVs) 100 and manned air vehicles, e.g., attack helicopters (not shown). Ground nodes may include unmanned ground vehicles (UGVs) 102, 104, 106, and ground forces including, for example, infantry units 108 and manned ground vehicles, e.g., tank units 110, 112, 114 and individual tanks 116. Some of these nodes are healing neurons, e.g., UVGs 102, 104, 106, with dynamic time dependent positions. Typically, the healing neurons may be used or recalled for healing the network when/if it is partitioned. Others of the remaining nodes may be used for training or for providing input to the neural network to adapt or readjust the healing nodes (neurons) positions to keep entire network connected. Also, each mobile node may employ an ANN element that functions as an approximator for approximating/estimating the link life to all neighboring nodes. The ANN elements may be trained either off-line or on-line. Examples of suitable ANN elements is discussed by S. Haykin in "Neural Networks: A Comprehensive Foundation," Macmillan Publishing, New York (1994). The ANN elements can be organized, for example, as Multilayer Perceptrons (MLP), or a Radial basis function neural network. Multilayer Perceptrons are widely used for pattern classification in a feed-forward network, are trained with a standard back-propagation algorithm and, are supervised in training for a desired response.

Further, a preferred MCNN is scalable. So, preferably, to facilitate managing large networks, the MCNN is organized in sub-networks of nodes or groups of nodes. A node is also known as a vertex. A plurality of nodes may be called vertices. Groups of nodes, also called clusters, may be treated as a single node when the cluster has full connectivity or a cluster leader or in the alternative as a cluster. The size, S(C), of a cluster C is the cardinal number C. Each cluster performs substantially as a MCNN within the bounds of the cluster. So, for example, if the infantry unit 108 includes a single MCNN device, the infantry unit 108 is a node. Alternately, each individual soldier in each infantry unit 108 may carry a personal MCNN unit (not shown) for individual communications and, therefore, is a node. Typically, each tank in each tank unit 110, 112, 114, includes a MCNN unit and, therefore, is a node and each tank unit 110, 112, 114 is a cluster. For convenience of discussion, in the graphical representation of FIG. 1B, the infantry unit 108 and tank unit 110, 112, 114 are taken as clusters and represented as a single node in the graph.

Each cluster and each node within a cluster has a known position and velocity and is capable of communicating directly with any other node within the cluster that is within range and not otherwise blocked. In the network graph of FIG. 1B, links between directly connected nodes/clusters 102, 104, 106, 108, 110, 112, 114 and 116 are represented by edges 101, 103, 105, 107, 109, 111, 113, 115, 118, 120, 122 and 124. Edges may also be called links. Two nodes that can communicate directly with each other are directly linked and can exchange information directly with one another. So, for example, the UAV 100 is directly connected, initially, to UVGs 102, 104, tank unit 112, and through link 118 to tank 116. Direct Communication may be blocked between two nodes, for example, by terrain, structures, atmospheric conditions, battlefield conditions (e.g., countermeasures) or otherwise. So, two nodes that cannot directly communicate (i.e., are not linked) can connect over a path through other directly linked nodes and so, are indirectly linked through one or more intervening nodes. For example, tank unit 110 is networked through link 120 to tank unit 112 and so, indirectly connected or linked to other nodes. Tank unit 114 is indirectly connected to the UAV 100, for example, through link 122 to tank 116 and through link 118 from tank 116. Infantry unit 108 connects to the network indirectly through link 124 to tank unit 114. An indirect path between tank unit 114 and UAV 100 may be via 116' or 116" through UVG 102 or UVG 104, respectively. The MCNN diameter is the graph diameter determined by the "longest shortest path" between any two nodes. So, in the present example, the MCNN diameter is the path between the infantry unit 108 and tank unit 110.

If all MCNN nodes are linked with all other nodes the network is not partitioned and has no need of partitioning (clustering). While this seldom occurs, even at the start of an operation and, once the operation is underway, it is extremely unlikely. However, as long as all of the nodes can communicate with each other, the MCNN is connected. Direct communication between two nodes may be blocked, for example, by terrain, structures, atmospheric conditions, battlefield conditions (e.g., countermeasures) or otherwise. So, two nodes that cannot directly communicate (i.e., are not linked) can connect over a path through other directly linked nodes and so, are indirectly linked through edges between one or more intervening nodes. Because normally, the nodes are constantly in motion, it is much more likely that most nodes will have one, two or, perhaps three or more linked nodes and communicate indirectly with the remaining network nodes. For example, tank unit 110 is networked through link 120 to tank unit 112 and so, indirectly connected or linked to other nodes. Tank unit 114 is indirectly connected to the UAV 100, for example, through link 122 to tank 116 and through link 118 from tank 116. Infantry unit 108 connects to the network indirectly through link 124 to tank unit 114.

The MCNN diameter is the graph diameter determined by the "longest shortest path" between any two nodes. So, in the present example, the MCNN diameter is five (5), i.e., the path between the infantry unit 108 and tank unit 110. While directly linked nodes substantially, instantaneously communicate with each other, connected nodes between indirectly linked nodes relay communications from one to the next, also referred to as hopping. Each indirect path adds to the workload of the intermediate or intervening nodes and adds delay (known as latency) to the communications. A communications path that meanders, perhaps unnecessarily, through the network may add unacceptable latency to communications and burdens all of the intervening nodes. So typically, the network has a defined maximum acceptable number of hops ($\delta$), e.g., selected as the result of off-line simulation/training.

At least initially, each cluster is a group of related nodes with a relationship based on the physical relationship of the respective nodes, e.g., based on command structure and/or physical location. Each cluster organized around what may be called a Cluster leader (CL) or a clusterhead. As nodes move about a given area, some nodes may switch from one cluster to another and occasionally, within a cluster, cluster leader nodes can handover that responsibility to another more qualified node. For an example of cluster identification and cluster leader selection, see, U.S. patent application Ser. No. 11/426,417, entitled "NEURAL NETWORK-BASED MOBILITY MANAGEMENT FOR MOBILE AD HOC RADIO NETWORKS," to Hesham El-Damhougy, filed coincident herewith, assigned to the assignee of the present invention and incorporated herein by reference.

Typically, an operator selects initial cluster leaders and, thereafter, the cluster leaders may each hand off to other cluster nodes whenever the cluster leader determines that such a hand off may be necessary or desired. Cluster leaders may be hierarchically organized with several sublevels within the MCNN and within each cluster. The size of each cluster is the number of nodes in the cluster. The degree of any node is the number of edges connected to the node, i.e., the number of directly linked nodes. A subset of nodes that are mutually reachable by a path of a given maximum length, k, is referred to as a k-cluster. A clique is a k-cluster with k=1. The infantry unit 108 and the tank units 110, 112 may each include several nodes and so, although represented graphically in FIGS. 1A and 1B as nodes, may each represent a clique or a k-cluster as shown in FIG. 1C.

FIG. 1C shows an example of hierarchical organization of a preferred MCNN with cluster leaders hierarchically organized with several sublevels within the MCNN and within each cluster. The nodes of FIG. 1A including the UAV 100, UGVs 102, 104, 106, the infantry unit 108 and the tank units 110, 112, 114 and tank 116 may each be designated/treated as a cluster. One node is identified as the manager over the entire MCNN and is designated as the Network Management System (NMS), the UAV 100 in this example. A single node is selected as cluster leader 108CL, 110CL, 112CL and 114CL from respective cluster members 108M, 110M, 112M and 114M in each of the infantry unit 108 and the tank units 110, 112, and 114. Each cluster leader 108CL, 110CL, 112CL and 114CL acts as a sub-network (cluster) manager. Optionally, secondary and tertiary or lower order cluster leaders (not shown) may be selected from members 108M, 110M, 112M and 114M in each respective cluster. Each cluster leader 108CL, 110CL, 112CL and 114CL is responsible for inter-cluster communication and cluster leaders 108CL, 110CL, 112CL and 114CL exchange information (e.g., node connectivity and strength, network status, and cluster leader assignment/reassignment information) with each other and with the NMS the UAV 100, e.g., MCNN status. Since each node may include an ANN element, each ANN node may be assigned/assume responsibility as a cluster leader, dynamically, as the cluster changes. Also, typically, each cluster leader may be assigned/assume responsibility as the NMS for the entire MCNN, dynamically, as the network configuration changes. The NMS may act as a local cluster leader or, as an independent node, unassigned to a cluster or assigned to a cluster of one.

Prior to deployment, simulation results collected for training the nodes, preferably, from theater simulation as described in U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005, assigned to the assignee of the present invention and incorporated herein by reference. An operator, for example, identifies cluster leaders and one node as the NMS. The nodes receive theater information and training results from the simulation that may include, for example, a coarse terrain map, a mission mobility profile, and coarse propagation models. The coarse propagation models may include suitable well-known telecommunications models, such as for example, an Epstein-Peterson model for physical analysis and mixed mode models, such as ITU Radiocommunication Sector (ITU-R) and Longley-Rice/Longley-Rice Adaptive models. Thereafter, the NMS and cluster leaders continually monitor MCNN status and predict network changes based on node mobility for real time network planning and healing. Cluster leaders can also take some local actions with respect to the cluster.

Each cluster leader maintains a connectivity matrix with links between the nodes represented with ones (1) and the lack of a connection represented as a zeros (0). The connectivity matrix indicates the connection of every node with every other node in the network and in network clusters. The cluster leaders and NMS use the connectivity matrix to monitor network connectivity and partition as necessary. At any point in time, each node may lose contact with linked nodes and/or make direct contact or re-establish direct contact with previously disconnected nodes. In some instances these changes may occur randomly, e.g., from node additions and deletions and from terrain or weather changes. For example, some nodes may move out of range of others, local interference such as terrain or countermeasures may block communications between nodes, and some nodes may even be destroyed. Also, intermediate paths may change as new nodes add themselves to the MCNN or as previously connected nodes reconnect. Whenever a link is lost, any disconnected nodes must find alternate connection paths that may force MCNN partition changes. In the example of FIG. 1A, tank 116 is destroyed, which breaks the links 118, 122 in the indirect connection between tank unit 114 and UAV 100. Consequently, tank unit 114 must reconnect indirectly to UAV 100 through UGV 102 or 104 over path 116' or 116". Also, tank unit 114 movement, e.g., into the hills, may break the link 124, forcing the infantry unit to reconnect through UGV 104 over path 124'.

Occasionally, over the course of an operation, some nodes/clusters may be completely separated from the rest and, so, the network is no longer connected. For example, a common linking node may be lost or a common link shared by a number of indirectly connected nodes may be lost. Such a disconnect partitions the network. Also, because of the fluid nature of the network, the cluster leaders or the NMS may decide to partition the network or a particular cluster. The MCNN may voluntarily partition itself, both to manage communications between nodes and communication between clusters. The network or a cluster may partition itself, for example, if the network/cluster is too long. The network may be considered too long, for example, when the network length exceeds the defined maximum length.

Maintaining cluster diameter/length below the defined maximum length is important because each relay in a multi-hop path adds a propagation delay in each direction. Accordingly, there is some overall delay that is additive of the individual delays from each link, typically referred to as latency. Communications traffic through a particular node also adds to that latency for paths through that node. While some latency may be acceptable, excessive latency may hamper communications. So, one way to keep the latency at an acceptable level is to limit network length to a maximum, and whenever the network or a cluster diameter/length exceeds that maximum, partitioning the network into clusters or the cluster into smaller clusters. In addition healing nodes may be added to avoid exceeding the maximum allowed number of hops between two arbitrary nodes. Adding healing nodes is described for example in U.S. patent application Ser. No. 11/426,428, "NEURAL NETWORK-BASED MOBILITY MANAGEMENT FOR HEALING MOBILE AD HOC RADIO NETWORKS," to Hesham El-Damhougy (hereinafter El-Damhougy III), filed coincident herewith, assigned to the assignee of the present invention and incorporated herein by reference. For example, if the infantry unit 108 of FIG. 1 splits into smaller groups, it may be partitioned into smaller clusters. For simplicity of discussion, partitioning as discussed hereinbelow with reference to a network of nodes has equal application to partitioning clusters in a network or partitioning nodes in a cluster.

Figures 2A, 2B:
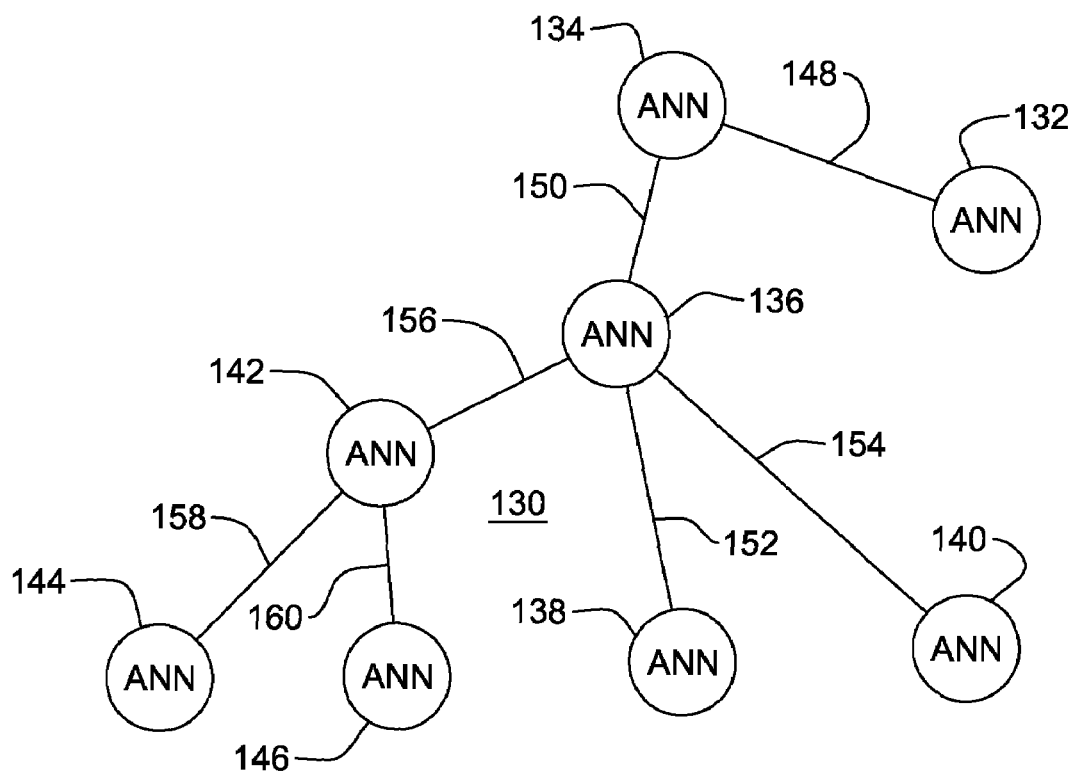
FIGS. 2A-B show an example of a network graph of nodes linked by edges and a corresponding connectivity matrix.

FIGS. 2A-B show an example of a graph (G) 130 of a network including nodes (V) 132, 134, 136, 138, 140, 142, 144, 146 linked by edges (E) 148, 150, 152, 154, 156, 158, 160 and a corresponding connectivity matrix ($\aleph$) 162 for the network 130. In this example, the network diameter ($\Delta$) is four (4). Connectivity for any network graph G(V,E) may be determined using a recursive operator ($\Omega$), or connectivity function, where $\Omega(\aleph) = \aleph$, $\Omega^2(\aleph) = [\omega_{ij}]$, $$\omega_{ij} = \begin{cases} 1 & \text{if } \sum_k a_{ik} a_{kj} > 0 \\ 0 & \text{otherwise} \end{cases}$$

and $\Omega^\eta(\aleph) = \Omega(\Omega^{\eta-1}(\aleph))$ for $\eta = 1, 2, \ldots$. So, for $\eta = $ Ceiling $(\log_2(\Delta))+1$, G is connected if and only if, the connectivity function to the $\eta^{th}$ order is unity, i.e., $\Omega^\eta(\aleph) = [1]$, and so, all entries are 1. Otherwise, the network is partitioned. As a corollary, for all $h \geq \eta$, $\Omega^h(\aleph) = [1]$. So, if the diameter of a particular graph is unknown, an arbitrarily large number may be selected to determine whether a network is connected or partitioned.

Figure 3:
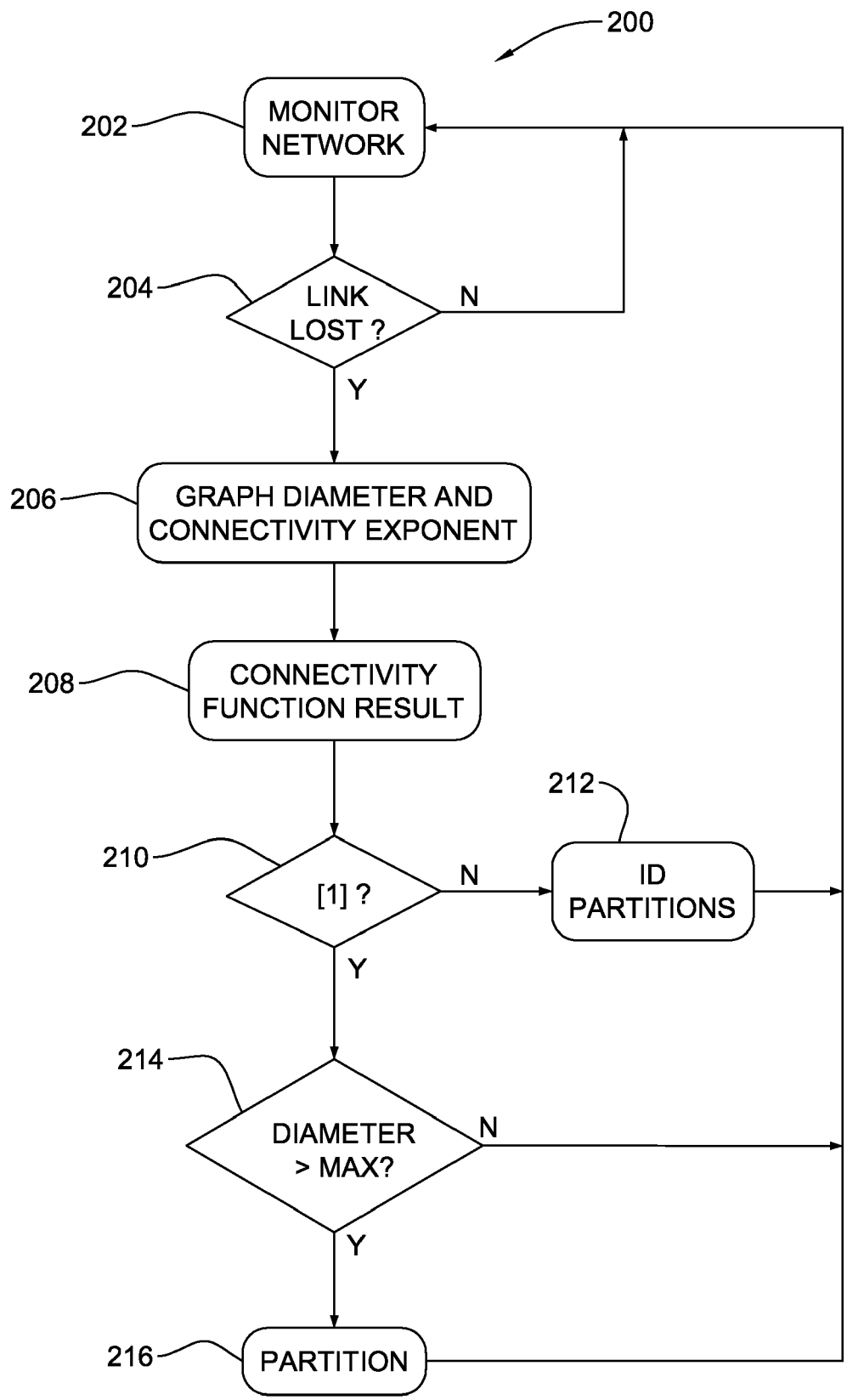
FIG. 3 shows an example of the steps in determining whether a particular network is connected.

FIG. 3 shows an example 200 of the steps in determining whether a network is connected or partitioned. In step 202, the network is continually monitored for the loss of a link. When in step 204 the network loses a link or at the beginning of a deployment, in step 206 the network graph diameter ($\Delta$) and the connectivity function exponent ($\eta$) are both determined. In step 208, connectivity function result matrix is generated by taking the $\eta^{th}$ order of the connectivity function. The result is checked for connectivity in step 210, and so, if the result is not unity, loss of the link partitioned the network. So, in step 212 the network partitions are identified and, returning to step 202, monitoring continues. Otherwise, the network is still connected. For the connectivity matrix example 162 of FIG. 2B, with $\Delta=4$, $\eta=3$ and $\Omega^3(\aleph)=[1]$, i.e., G 162 is connected. So, if the network remains connected in step 210, then, in step 214, the network diameter is checked to determine if, as a result of the loss of the link, the diameter exceeds the maximum allowed length. If not, monitoring continues in step 202. Otherwise, if the diameter exceeds the maximum allowed length, then in step 216, the network is partitioned voluntarily and, returning to step 202 monitoring continues. Connectivity may be checked periodically consonant with a predefined periodicity parameter, i.e., every $\tau$ units of time, where $\tau$ is a selected system parameter that can be either deterministic or a random variable. This system parameter can be identified during the system simulation and then adaptively refined or fine tuned during real time operation.

During normal operation with nodes in constant motion, periodically, each node sends connectivity table updates to the cluster leader. Preferably, for computational efficiency, a node initiates an update to the cluster leader only when table entries change in the node and each node sends only the changed entries. Each cluster leader monitors link quality in the cluster and maintains tables and matrices, including the connectivity matrix 162 (for k nodes in the cluster, the cluster leader maintains connectivity matrices $C_1, C_2, \ldots, C_k$) and a link life matrix, for local nodes within the cluster. Once the network is found to be partitioned and the connectivity matrix rank is determined, partitions can be identified. A binary relationship can be used, for example, to designate connected (~) nodes $(\alpha,\beta)$ in the set of network nodes V, i.e., $\alpha\sim\beta$, if and only if $\alpha$ and $\beta$ are connected by a path in V. This relationship produces a unique disjoint partition of network nodes V into equivalence classes. An equivalence class of a node $\alpha$ is denoted by $R_\alpha$ that is reflexive, i.e., $(\alpha R\alpha)$ for all $\alpha\epsilon V$; is transitive, i.e., $\alpha R\beta$, $\beta R\gamma$ implies $\alpha R\gamma$; and is symmetric $\alpha R\gamma$ implies $\beta R\alpha$. Alternately, normal linear algebra operators may be used in vector analysis to identify partitions. An arbitrary node may be selected and the corresponding connectivity row being treated as a row vector and any column with a non-zero dot product result is connected, which may be represented as, $R_\alpha=\{\beta\epsilon V: \alpha\neq\beta\}$. Still other non-efficient algorithm may be used that rely on permutation of rows or columns, of the connectivity matrix, to arrive at a diagonal-like form matrix.

Figure 4A:
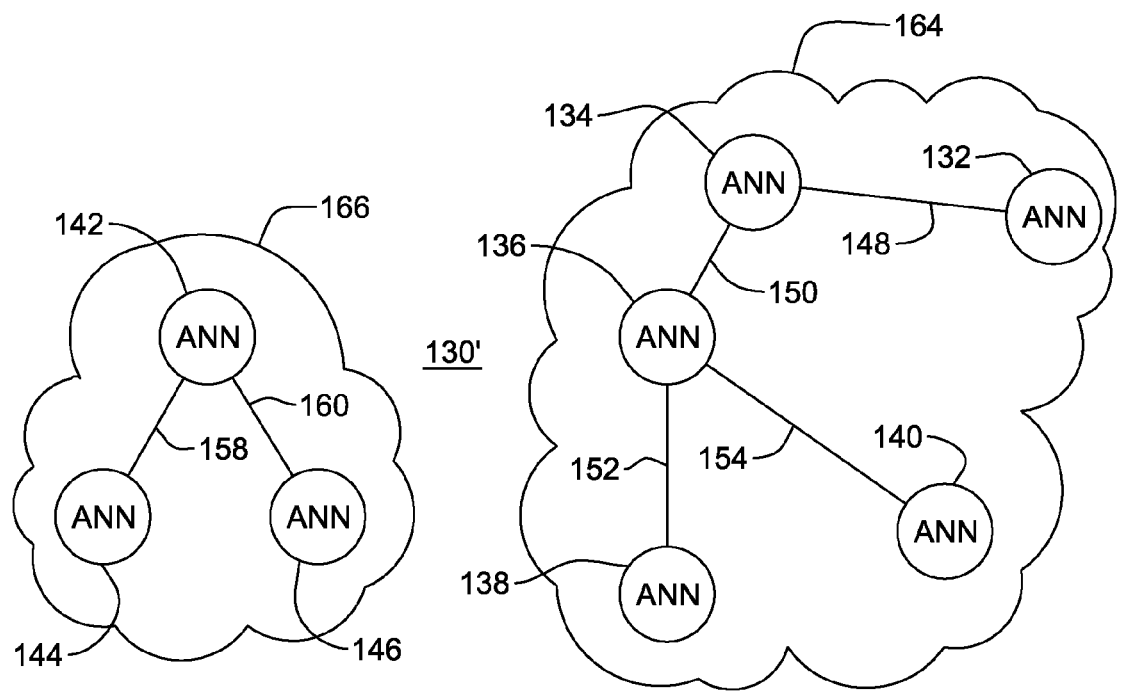
FIG. 4A shows an example of forced partition of the network of FIG. 2A.
Figure 4B:
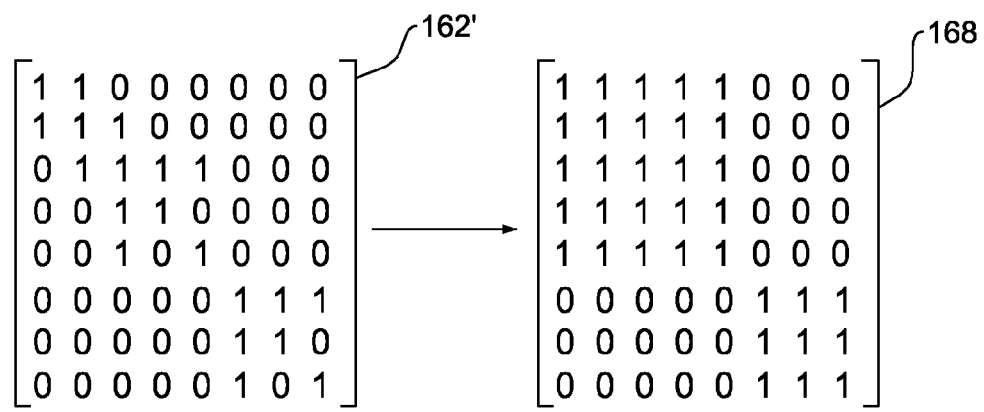
FIG. 4B shows a corresponding example of the modified connectivity matrix and connectivity function result indicating the forced partition into two partitions.

FIG. 4A shows an example of the same network 130' after losing a link (156) between two clusters 164, 166 of nodes 132, 134, 136, 138, 140 and, 142, 144, 146. FIG. 4B shows an example of the modified connectivity matrix 162' and connectivity function result matrix 168, which has a rank of 2 that indicates partition into two partitions. In both the connectivity matrix 162' and connectivity function result matrix 168 each row (i) corresponds to one of the nodes 132, 134, 136, 138, 140, 142, 144 and 146, respectively. Each column (j) similarly corresponds to one of the nodes 132, 134, 136, 138, 140, 142, 144 and 146, respectively. Thus, for each row in the connectivity function result matrix 168 the corresponding node 132, 134, 136, 138, 140, 142, 144 or 146, is clustered/communicating with nodes identified by a one (1) in a corresponding column. So, cluster 164 is indicated by ones in row 1, column 1 to row 5, column 5; and cluster 166 is indicated by ones in row 6, column 6 to row 8, column 8.

Again, it should be noted that partition identification may be applied to a network of any size including very large networks by recursively dividing the network into smaller sub-networks for network clustering, e.g., based on group mobility criteria or command structure. Each connected subnet collapses into what may be treated as one node.

Network graph is represented by an undirected graph (V,E); $V=\{1, 2, \ldots, N\}$ is the set of nodes, and $E \subseteq \{\{U,V\}/U,V\epsilon V\}$ set of edges. Any graph (G) may be considered the union of a number ($\pi$) of smaller sub-graphs ($G_i$) or node clusters, with a maximum diameter ($\delta$, where $\delta=\text{Max}_i\{\text{diameter}(G_i)\}$) according to the relationship $G=UG_i=((V_1U \ldots UV_\pi), ((E_1U \ldots UE_\pi))$ and having connected cluster subsets $(V_i\cap V_\pi)=\Phi$, $(E_i\cap E_\pi)=\Phi$ for $i\neq j$, where $\pi$ is the rank of G and may be determined from $\pi=\Omega\text{Ceiling} (\log 2(\delta))+1$ ($\aleph$). So, a connected graph with a diameter that exceeds the maximum length, k, may be partitioned into two or more intersecting clusters (sub-graphs), with disjoint vertices, each with a maximum diameter of k; unless the $k^{th}$ order of the connectivity function is not unity. More specifically, if $\Omega^k(\aleph)\neq[1]$ (i.e., at least one entry is a zero), then G is disconnected and can be partitioned into two or more clusters, each with a diameter $\leq k$. So, a node, a cluster leader or the NMS can determine for any network or sub-network, if the network is connected and/or whether partitioning is in order by application of $\Omega$ to the respective connectivity matrix.

Figure 5A:
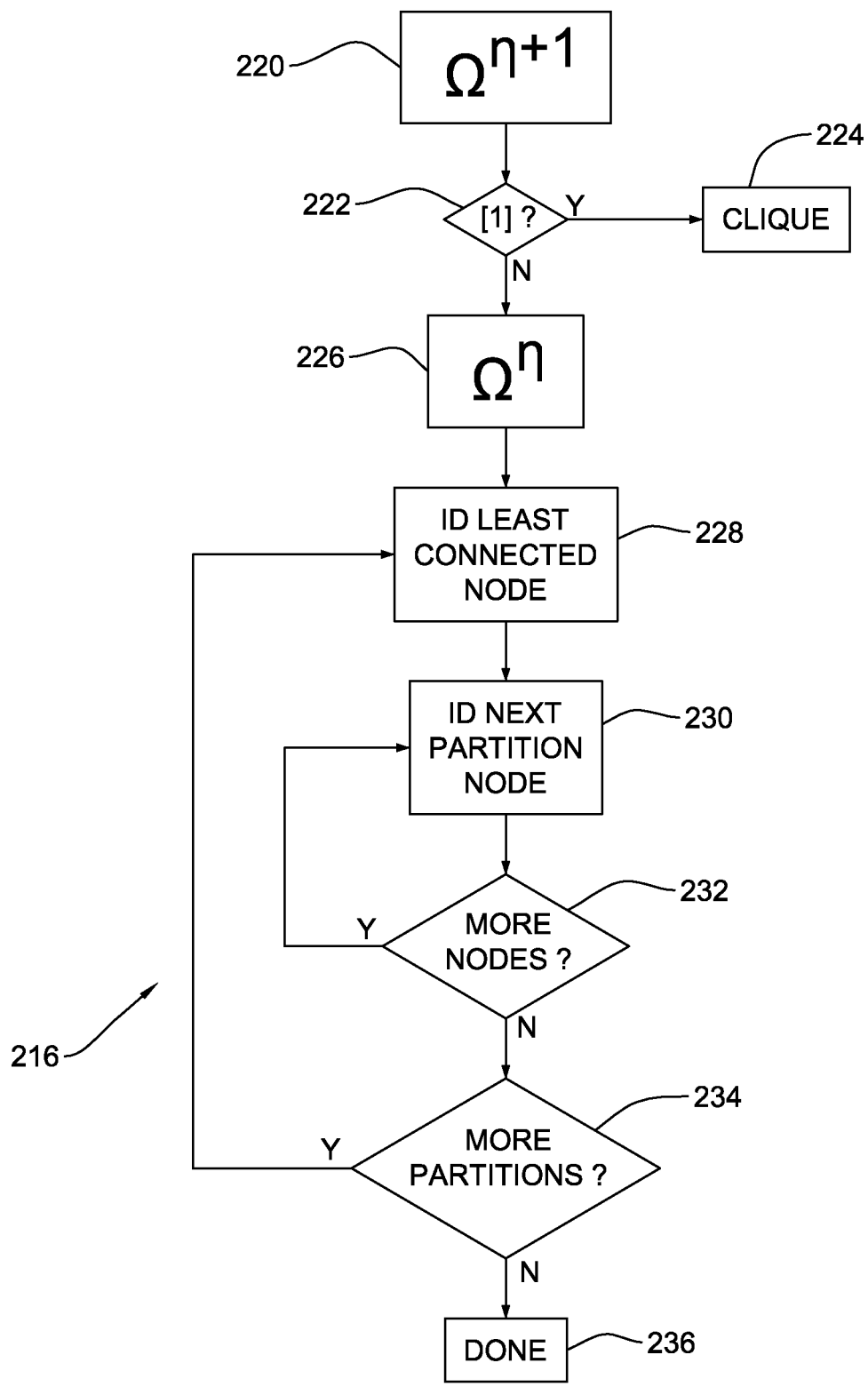

FIG. 5A shows an example of the step (216 in FIG. 3) of voluntarily partitioning the network when, for example, the network diameter exceeds the defined maximum number of hops, having the form $H=2^\eta$. FIG. 5B shows a corresponding pseudo-code example voluntarily partitioning the network corresponding to the steps of FIG. 5A. Typically, partitioning to form clusters does not provide unique results and may be simple and straightforward if the number of disjoint clusters is known a priori. Thus, when the number of disjoint clusters is known in advance, any suitable partition algorithm may be applied, e.g., known as the k-means clustering algorithm.

However, partitioning is more complex for an unpartitioned network where the nodes (or vertices V) do not belong to a collection of known intersecting subsets of network nodes (i.e., $V\neq\Phi$) and, so, the number of clusters is unknown; and where the number of hops $H=2^\eta$ is less than the defined maximum diameter. Instead, partitioning begins in step 220 by finding the network connectivity beyond the maximum length, by taking the $\Omega^{\eta+1}(\aleph)$. In step 222, if $\Omega^{\eta+1}(\aleph)=[1]$, the network is a connectivity clique 224 (i.e., all nodes are within the minimum length of each other) and no partition is detected. Otherwise, in step 226 $\Omega^\eta(\aleph)$ provides a modified pattern matching, similar to the result of FIG. 4B, that is applied to the network to identify partitions. Pattern matching begins in step 228 with a node identified as having the minimum degree, $\delta$. So, $\delta$ can range between one (1) and one less than the number of nodes in the unpartitioned network. In step 230 the identified nodes are listed and ordered according to degree in ascending order and the identified nodes are removed from the list. Partition identification continues until a partition is identified in step 232 and returning to step 228, the remaining nodes are identified to another cluster until in step 234 it is found that all of the nodes are assigned to one subset or cluster and partitioning ends in 236.

Figure 6A:
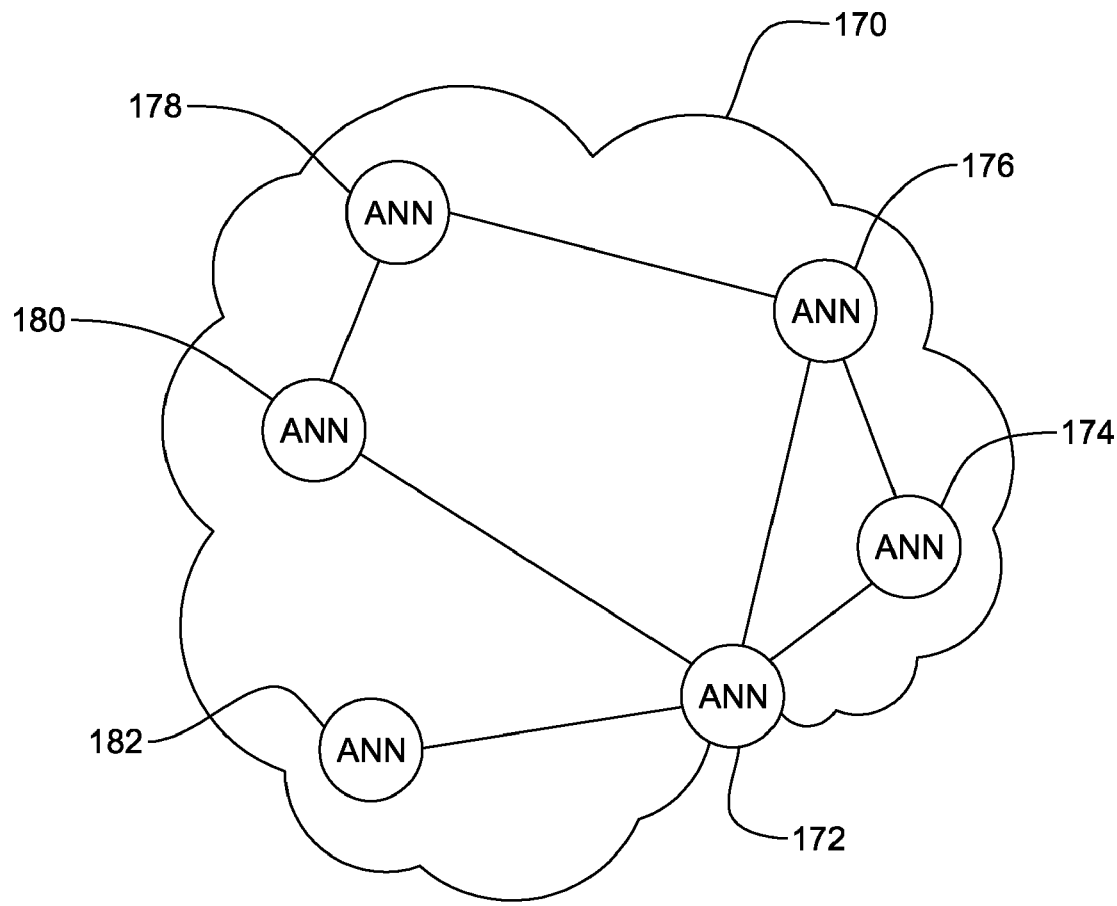
FIGS. 6A-D show an example of partitioning a network wherein the diameter exceeds the defined maximum (2 in this example) allowed number of hops.
Figure 6B:
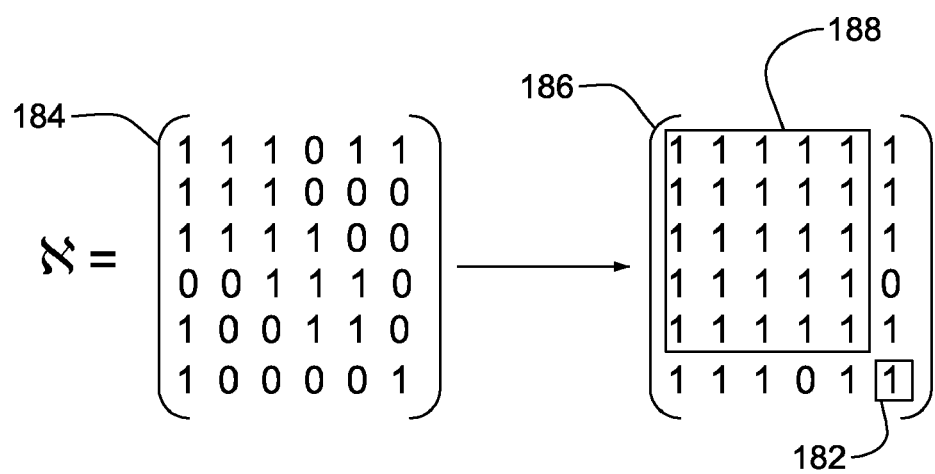
Figure 6C:
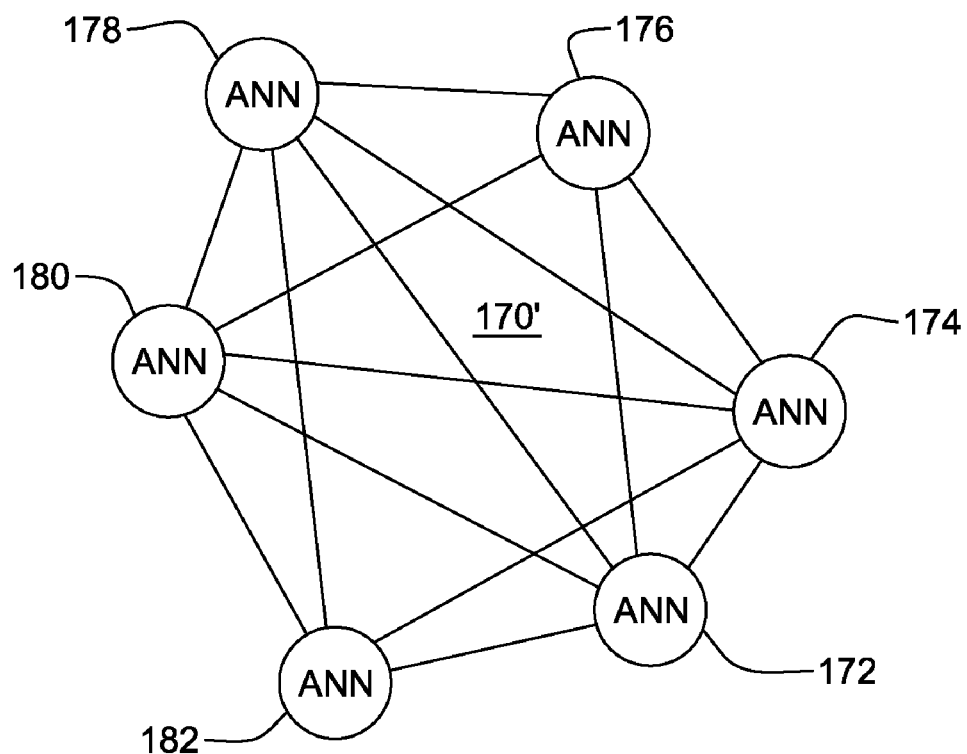
Figure 6D:
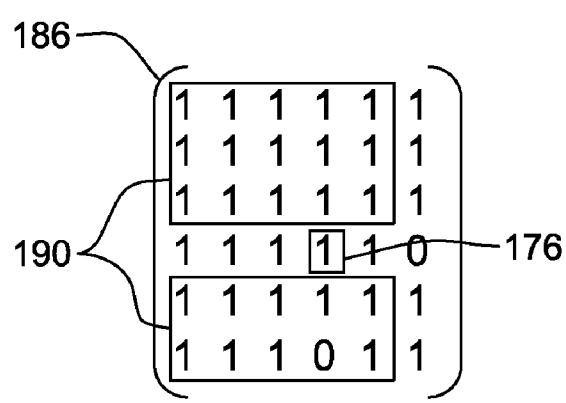

FIG. 6A-D shows an example of voluntarily partitioning a network 170 with 6 nodes 172, 174, 176, 178, 180, 182 with a maximum allowed number of hops $H=2$, a diameter $\Delta=3$ and $\log_2(H)+1=2=\eta$. Node 182 has a degree of 1 and node 172 has a degree of 4. FIG. 6B shows the connectivity graph 184 and partition identification result matrix $\Omega^\eta(\aleph)$ 186. Within the constraints of the network, i.e., considering a maximum allowed number of 2 hops as being linked, the modified network 170' of FIG. 6C may be derived from the partition identification matrix 186 with pseudo links between nodes indicating connectivity within the constraints of the network (i.e., connected in no more than the maximum number of hops). So, the partition identification matrix 186 may be treated as a connectivity graph for the modified network 170'. Thus, acceptable partitions are identified by node 182 and connectivity clique 188 in FIG. 6B or node 176 and connectivity clique 190 in FIG. 6D. In either partition the single node 182, 176 forms a single node clique. Thus, it is apparent that the network 170, 170' may be partitioned according to partition boundaries 182, 188 or 176, 190.

Otherwise, when the defined maximum number of hops H has a form other than $2^n$ and $\Omega^{n+1}(\aleph) \neq [1]$, a k-clique algorithm may be applied to the network, where $k=H-2^n$. For an example of a suitable k-clique algorithm, see Edachery, et al., "Graph Clustering using Distance-k Cliques," *Proceedings of the 7th International Graph Drawing Symposium*, number LNCS 1731, pp. 98-106 (1999). The resulting network has H-bounded disjoint clusters.

The NMS manages, coordinates and monitors these network changes (link losses, node additions and deletions) with the cluster leaders and each cluster leader manages and coordinates changes within its respective cluster. As noted hereinabove, each node continually gathers connectivity data with connected nodes, e.g., signal strength, relative direction of travel and relative speed. The collected data is distributed throughout the MCNN for maintaining connectivity. The NMS and cluster leaders use the collected data in node mobility prediction to track and predict node movement for maintaining connectivity through partition changes that may be caused by predictable/forecastable events. Node mobility prediction is described, for example, in U.S. Pat. No. 7,555, 468, "NEURAL NETWORK-BASED NODE MOBILITY AND NETWORK CONNECTIVTY PREDICTIONS FOR MOBILE AD HOC RADIO NETWORK RKS," to Hesham El-Damhougy, filed coincident herewith, assigned to the assignee of the present invention and incorporated herein by reference.

When the network is partitioned because two nodes lose communication with each other, the NMS and/or the responsible cluster leader take(s) remedial action. Typically, the NMS and/or the responsible cluster leader determine(s) an expected time-to-reconnect, find alternate connection paths, nodes to be repositioned, or whether to reconfigure the partitions to heal the MCNN. Network planning and healing is described in more detail, for example, in El-Damhougy III. The cluster leader may determine a time-to-reconnect, for example, as the length of time elapsed before a particular pair of disconnected nodes will. So after losing the link to tank unit 114, for example, the infantry unit 108 may be repositioning to a location with a clear path to the tank unit 114. The cluster leader for infantry unit 108 calculates a time to reconnect based on the relative speed of the tank unit 114, the course and speed of the infantry unit 108 and any previously provided terrain information. Likewise, the cluster leader for tank unit 114 calculates a time to reconnect based on the relative speed of the infantry unit 108, the course and speed of the tank unit 114 and the same previously provided terrain information.

Advantageously, a preferred ad hoc communications network is self-managing and adapts well to operating changes, and in particular to interconnectivity changes between preferred nodes. The network is self-partitioning both for necessity, e.g., the loss of a link or linking node that divides the network into unconnected pieces, or voluntarily, e.g., to conform with network constraints.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

I claim:

1. A method of managing an ad hoc communications network, said method comprising the steps of:
    a) determining node connectivity for a plurality of nodes forming said ad hoc communications network, wherein determining node connectivity comprises representing connectivity of said plurality of nodes as a matrix ($\aleph$), direct connection between pairs of nodes being represented by ones in corresponding matrix locations and lack of direct connection between said pairs of nodes being represented by zeroes in said corresponding matrix locations;
    b) determining the diameter of said ad hoc communications network, wherein said diameter ($\Delta$) is the least number of hops in the longest communications path between two connected said nodes in said ad hoc communications network;
    c) determining a connectivity function for said ad hoc communications network, wherein determining said connectivity function comprises applying a recursive operator ($\Omega$) to said matrix, said recursive operator having the form $\Omega(\aleph)=\aleph$, where $\Omega^2(\aleph)=[\omega_{ij}]$, $$\omega_{ij} = \begin{cases} 1 & \text{if } \sum_k a_{ik} a_{kj} > 0 \\ 0 & \text{otherwise} \end{cases}$$

and $\Omega^\psi(\aleph)=\Omega(\Omega^{\psi-1}(\aleph))$; and
    d) determining whether said connectivity function indicates that said ad hoc communications network is connected.

2. A method as in claim 1, wherein said recursive operator is recursively applied a number ($\eta$) of times responsive to said network diameter.

3. A method as in claim 2, wherein $\eta = \text{Ceiling}(\log_2(\Delta))+1$.

4. A method as in claim 3, wherein the step (d) of determining whether said ad hoc communications network is connected comprises checking whether the result of $\Omega^\eta(\aleph)$ is a unity matrix.

5. A method as in claim 4, wherein whenever said result is other than a unity matrix, said ad hoc communications network is partitioned, partitions being defined by said result.

6. A method as in claim 5, wherein said result indicates connected nodes in each partition, a one in said result indicating connection between two corresponding ones of said plurality of nodes.

7. A method as in claim 5, wherein before the step (a) of determining node connectivity, said method further comprises monitoring activity in said ad hoc communications network until a connection is lost between directly connected pair of nodes.

8. A method of managing an ad hoc communications network, said method comprising the steps of:
    a) maintaining connectivity matrix ($\aleph$) for a plurality of nodes in said ad hoc communications network, said connectivity matrix indicating connectivity between pairs of said plurality of nodes;
    b) determining the diameter ($\Delta$) of said connectivity matrix, said diameter being the least number of hops in the longest communications path between two connected nodes;
    c) selectively determining a connectivity function for said ad hoc communications network; and d) determining a rank of said connectivity matrix from said connectivity function.

9. A method as in claim 8, wherein direct connection between pairs of nodes is represented by ones in corresponding matrix locations and lack of direct connection between said pairs of nodes is represented by zeroes in said corresponding matrix locations.

10. A method as in claim 9, wherein the step (c) of selectively determining the connectivity function comprises determining if said diameter is larger than a defined maximum length ($\delta$).

11. A method as in claim 10, wherein the step (c) of determining said connectivity function comprises applying a recursive operator ($\Omega$) to said matrix, said recursive operator having the form $\Omega(\aleph)=\aleph$, where $\Omega^2(\aleph)=[\omega_{ij}]$, $$\omega_{ij} = \begin{cases} 1 & \text{if } \sum_k a_{ik} a_{kj} > 0 \\ 0 & \text{otherwise} \end{cases}$$

and $\Omega^\psi(\aleph)=\Omega(\Omega^{\psi-1}(\aleph))$.

12. A method as in claim 11, wherein said recursive operator is recursively applied a number ($\eta$) of times, wherein $\eta=\text{Ceiling}(\log_2(\delta))+1$ and said rank is indicated by the result of $\Omega^\eta(\aleph)$.

13. A method as in claim 12, wherein whenever $\Omega^{\eta+1}(\aleph)$ is a unity matrix, said plurality of nodes remain unpartitioned.

14. A method as in claim 12, wherein said result indicates connected nodes with a connection length less than said defined maximum length, a one in said result indicating connection between two corresponding ones of said plurality of nodes, said plurality of nodes being voluntarily partitioned into a number of connected sub-networks indicated by said result.

15. A method as in claim 14, wherein voluntarily partitioning said plurality of nodes comprises the steps of:
   i) selecting a least connected node from said plurality of nodes;
   ii) identifying another of said plurality of nodes connected to the selected said least connected node;
   iii) checking whether any unselected ones of said plurality of nodes are connected to said least connected node;
   iv) returning to step (ii) until all nodes connected to said least connected node;
   v) selecting a remaining least connected node from unselected ones of said plurality of nodes until all nodes have been selected; and
   vi) halting when all nodes have been selected, otherwise, returning to step (ii).

16. A method as in claim 15, wherein before the step (a) of determining node connectivity, said method further comprises monitoring activity in said plurality of nodes until a connection is lost between a directly connected pair of nodes.

17. A method of managing an ad hoc communications network, said method comprising the steps of:
   a) monitoring node connectivity for at least one node in an ad hoc communications network;
   b) updating a connectivity matrix representing said ad hoc communications network responsive to an identified change in connectivity, said connectivity matrix indicating connectivity between at least two said nodes, direct connection between at least two said nodes being represented by ones in corresponding matrix locations and lack of direct connection being represented by zeroes;
   c) determining the diameter ($\Delta$) of said ad hoc communications network;
   d) determining whether said diameter is larger than a defined maximum length ($\delta$);
   e) determining a connectivity function for said ad hoc communications network;
   f) determining whether said connectivity function indicates that said ad hoc communications network is connected; and if said ad hoc communications network is connected,
   g) determining a rank of said connectivity matrix from said connectivity function.

18. A method as in claim 17, wherein said diameter is the least number of hops in the longest communications path between two connected mobile nodes in said ad hoc communications network.

19. A method as in claim 17, wherein the steps (e) of determining said connectivity function and (g) of determining rank comprises applying a recursive operator ($\Omega$) to said matrix, said recursive operator having the form $\Omega(\aleph)=\aleph$, where $\Omega^2(\aleph)=[\omega_{ij}]$, $$\omega_{ij} = \begin{cases} 1 & \text{if } \sum_k a_{ik} a_{kj} > 0 \\ 0 & \text{otherwise} \end{cases}$$

and $\Omega^\psi(\aleph)=\Omega(\Omega^{\psi-1}(\aleph))$.

20. A method as in claim 19, wherein said recursive operator is recursively applied a number ($\eta$) of times responsive to said network diameter in step (f) and $\eta=\text{Ceiling}(\log_2(\Delta))+1$.

21. A method as in claim 20, wherein the step (f) of determining whether said ad hoc communications network is connected comprises checking whether the result of $\Omega^\eta(\aleph)$ is a unity matrix.

22. A method as in claim 21, wherein whenever said result is other than a unity matrix, said ad hoc communications network is partitioned, a one in said result indicating two corresponding connected mobile nodes in a partition.

23. A method as in claim 19, wherein said recursive operator is recursively applied a number ($\eta$) of times responsive to said defined maximum length ($\delta$) in step (g) and wherein $\eta=\text{Ceiling}(\log_2(\delta))+1$ and said rank is indicated by the result of $\Omega^\eta(\aleph)$.

24. A method as in claim 23, wherein whenever $\Omega^{\eta+1}(\aleph)$ is a unity matrix, a plurality of said nodes remain unpartitioned and otherwise, said result indicates connected said nodes with a connection length less than said defined maximum length, a one in said result indicating connection between at least two corresponding said nodes, a plurality of said nodes being voluntarily partitioned into a number of connected sub-networks indicated by said result.

25. A method as in claim 24, wherein voluntarily partitioning said plurality of mobile nodes comprises the steps of:
   i) selecting a least connected said node from a plurality of said nodes;
   ii) identifying another of a plurality of said nodes connected to the selected least connected said node;
   iii) checking whether any unselected said nodes of the plurality of said nodes are connected the least connected said node;

iv) returning to step (ii) until all mobile nodes connected to the least connected said node;
v) selecting a remaining least connected said node from unselected said nodes of the plurality of said nodes until all said nodes have been selected; and
vi) halting when all said nodes have been selected, otherwise, returning to step (ii).

* * * * *